US012638901B2

(12) United States Patent
Kapinos et al.

(10) Patent No.: US 12,638,901 B2
(45) Date of Patent: May 26, 2026

(54) COMPUTING SYSTEM POWER-ON USING CIRCUIT

(71) Applicant: Lenovo (Singapore) Pte. Ltd.,
Singapore (SG)

(72) Inventors: Robert J Kapinos, Durham, IN (US);
Scott Li, Cary, NC (US); **Robert
James Norton, Jr.**, Raleigh, NC (US);
Russell Speight VanBlon, Raleigh, NC
(US)

(73) Assignee: Lenovo (Singapore) Pte. Ltd.,
Singapore (SG)

( * ) Notice: Subject to any disclaimer, the term of this
patent is extended or adjusted under 35
U.S.C. 154(b) by 0 days.

(21) Appl. No.: 17/946,469

(22) Filed: Sep. 16, 2022

(65) Prior Publication Data

US 2024/0094795 A1     Mar. 21, 2024

(51) Int. Cl.
*G06F 1/32*          (2019.01)
*G06F 1/3231*        (2019.01)
*G06F 1/3287*        (2019.01)

(52) U.S. Cl.
CPC .......... *G06F 1/3231* (2013.01); *G06F 1/3287*
(2013.01)

(58) Field of Classification Search
CPC ........................................................ G06F 1/32
See application file for complete search history.

(56) References Cited

U.S. PATENT DOCUMENTS

| | | | | | |
|---|---|---|---|---|---|
| 2005/0015636 | A1* | 1/2005 | Chen | ......................... | G06F 1/28 |
| | | | | | 713/323 |
| 2006/0090088 | A1* | 4/2006 | Choi | ..................... | G06F 1/3215 |
| | | | | | 713/300 |
| 2011/0080367 | A1* | 4/2011 | Marchand | ............. | G06F 1/3215 |
| | | | | | 345/173 |
| 2013/0314349 | A1* | 11/2013 | Chien | ................... | G06F 1/1626 |
| | | | | | 345/173 |
| 2014/0176332 | A1* | 6/2014 | Alameh | ................. | G06V 40/67 |
| | | | | | 340/5.82 |
| 2015/0012769 | A1* | 1/2015 | Koga | .................... | G06F 3/1229 |
| | | | | | 713/323 |
| 2015/0015475 | A1* | 1/2015 | Ely | ......................... | G06F 1/169 |
| | | | | | 345/156 |
| 2016/0187955 | A1* | 6/2016 | Kawaura | .............. | G06F 1/3209 |
| | | | | | 713/310 |
| 2017/0031495 | A1* | 2/2017 | Smith | ................... | G06F 3/0418 |
| 2017/0302821 | A1* | 10/2017 | Sasa | ................... | H04N 1/40056 |
| 2017/0336877 | A1* | 11/2017 | Kämpf | ................. | G06F 1/3262 |
| 2018/0239490 | A1* | 8/2018 | Yang | ...................... | G06F 21/00 |
| 2018/0314387 | A1* | 11/2018 | Hwang | ................. | G06N 20/00 |
| 2018/0365466 | A1* | 12/2018 | Shim | ..................... | G06V 40/67 |
| 2019/0250685 | A1* | 8/2019 | Staude | ..................... | G06F 1/28 |
| 2020/0081516 | A1* | 3/2020 | Zyskind | ............. | G06F 3/04883 |
| 2021/0250433 | A1* | 8/2021 | Liu | ........................ | H01H 13/85 |

\* cited by examiner

*Primary Examiner* — Phil K Nguyen
(74) *Attorney, Agent, or Firm* — FERENCE &
ASSOCIATES LLC

(57)          ABSTRACT

One embodiment provides a method, the method including:
detecting, at an information handling device utilizing a input
detection system and while the information handling device
is in a low power state, a physical user input at an input
mechanism of the information handling device, wherein the
detecting comprises detecting a force at the input mecha-
nism; determining, utilizing the input detection system, the
physical user input comprises a request to power-on the
information handling device; and powering on the informa-
tion handling device. Other aspects are claimed and
described.

16 Claims, 3 Drawing Sheets

COMPUTING SYSTEM POWER-ON USING CIRCUIT

BACKGROUND

A major factor when utilizing an electronic information handling device is maintaining charge, or battery life, in order for the information handling device to function. Rechargeable batteries are routinely installed in information handling devices. In order to utilize a system that contains a rechargeable battery, the battery has to periodically be charged by plugging the device into a power source for an amount of time. This amount of time is dependent on the size of the battery and an amount of required charge needed to power a system. As an information handling device's battery dwindles down to exhaustion, components of the information handling device can be deactivated in an attempt to extend an amount of time in which the information handling device may be used.

BRIEF SUMMARY

In summary, one aspect provides a method, the method including: detecting, at an information handling device utilizing a input detection system and while the information handling device is in a low power state, a physical user input at an input mechanism of the information handling device, wherein the detecting comprises detecting a force at the input mechanism; determining, utilizing the input detection system, the physical user input comprises a request to power-on the information handling device; and powering on the information handling device.

Another aspect provides a system, the system including: an input mechanism; a processor operatively coupled to the input mechanism; a memory device that stores instructions that when executed by the processor, causes the system to: detect, a input detection system and while the information handling device is in a low power state, a physical user input at the input mechanism of the information handling device, wherein the detecting comprises detecting a force at the input mechanism; determine, utilizing the input detection system, the physical user input comprises a request to power-on the information handling device; and power on the information handling device.

A further aspect provides a product, the product including: a computer-readable storage device that stores executable code that, when executed by a processor, causes the product to: detect, a input detection system and while the information handling device is in a low power state, a physical user input at an input mechanism of the information handling device, wherein the detecting comprises detecting a force at the input mechanism; determine, utilizing the input detection system, the physical user input comprises a request to power-on the information handling device; and power on the information handling device.

The foregoing is a summary and thus may contain simplifications, generalizations, and omissions of detail; consequently, those skilled in the art will appreciate that the summary is illustrative only and is not intended to be in any way limiting.

For a better understanding of the embodiments, together with other and further features and advantages thereof, reference is made to the following description, taken in conjunction with the accompanying drawings. The scope of the invention will be pointed out in the appended claims.

DETAILED DESCRIPTION

Figure 1:
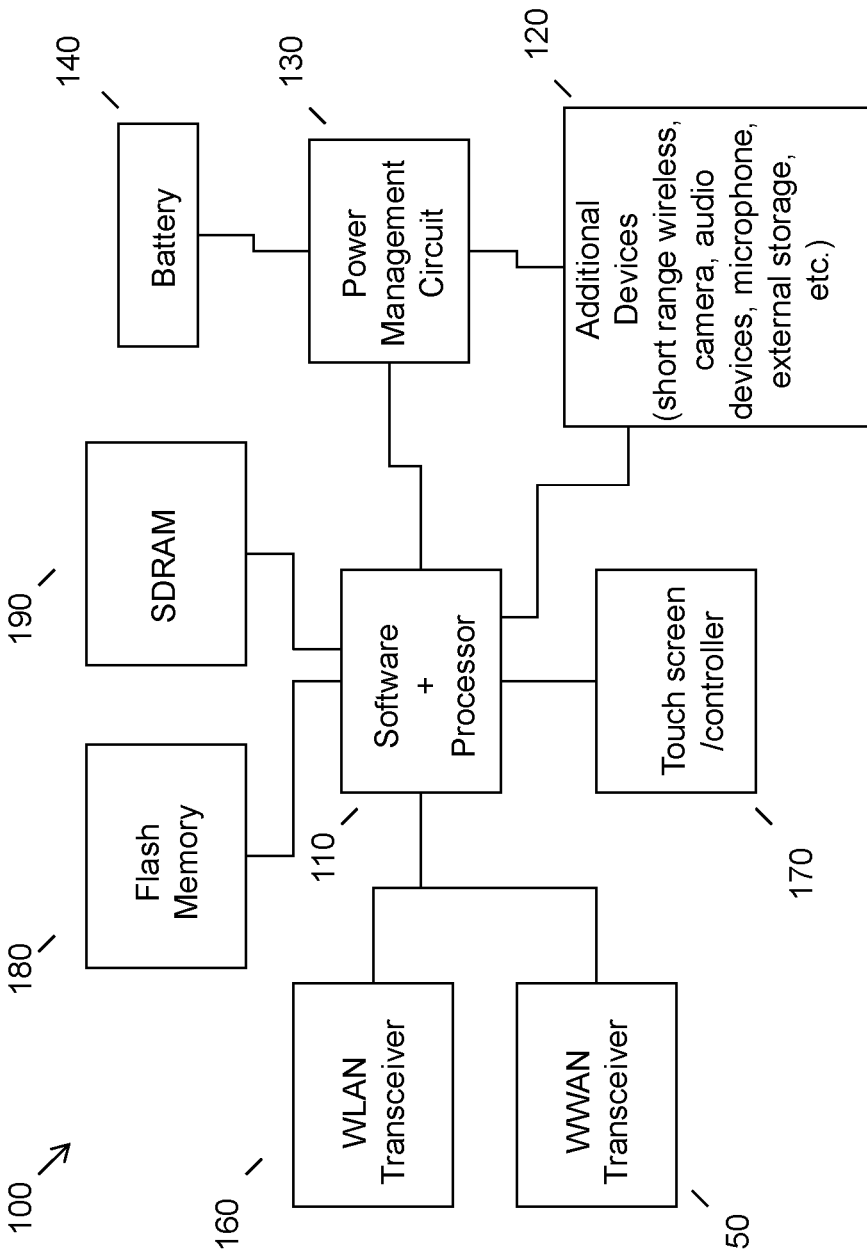
FIG. 1 illustrates an example of information handling device circuitry.

It will be readily understood that the components of the embodiments, as generally described and illustrated in the figures herein, may be arranged and designed in a wide variety of different configurations in addition to the described example embodiments. Thus, the following more detailed description of the example embodiments, as represented in the figures, is not intended to limit the scope of the embodiments, as claimed, but is merely representative of example embodiments.

Reference throughout this specification to "one embodiment" or "an embodiment" (or the like) means that a particular feature, structure, or characteristic described in connection with the embodiment is included in at least one embodiment. Thus, the appearance of the phrases "in one embodiment" or "in an embodiment" or the like in various places throughout this specification are not necessarily all referring to the same embodiment.

Furthermore, the described features, structures, or characteristics may be combined in any suitable manner in one or more embodiments. In the following description, numerous specific details are provided to give a thorough understanding of embodiments. One skilled in the relevant art will recognize, however, that the various embodiments can be practiced without one or more of the specific details, or with other methods, components, materials, et cetera. In other instances, well known structures, materials, or operations are not shown or described in detail to avoid obfuscation.

When the rechargeable battery that powers an information handling device has minimal power, the information handling device will enter low-power mode. A low-power mode is commonly activated when the charge of a battery of a device reaches a threshold value of remaining charge. For example, a battery supervising component of a system may determine that a low-power mode will be activated when 10 percent of the total battery charge is detected. Low-power modes may also be activated when the device has been inactive for a predetermined length of time, upon input to a low-power mode button or function, and/or the like. Conventionally, a low-power mode of a device will deactivate components in an attempt to extend the battery life of the device. In a low-power mode, not all components are deactivated, since some components need to remain active to detect input to the device that indicates the device should be powered on. This approach utilizes a system to determine which components of a device to deactivate and further will determine which components of a device must remain active.

The low-power mode is intended to allow quicker access to the whole system as compared to a complete power-down and power up. Thus, a low-power mode can be a misleading term because even though some components can undergo a variable change in an attempt to save power, multiple larger components of device will remain active. For example, detection, and/or powering-on, components of a device will remain active even when a device is in a low-power mode because such components will detect when a user is attempting to access a device. Upon detection of an input to activate the device as a whole, a signal will need to be provided from a detection component to a component to power-on a device by sending complicated BUS signals between the components. This requires an amount of power to maintain these components, thereby continuing to drain the battery even when in low-power mode.

Additionally, when a device is in a low-power mode, the device will maintain system operation checks, such as resistance checks, checks at the on/off switch, and the like. Power to such components will be maintained to ascertain that issues do not arise in the system while in the low-power mode. Once again, in order for these commonly active components to remain operable, an amount of power is used by the components. Thus, the conventional use of a low-power mode in a device commonly requires the maintaining of active components within a device that utilize battery power. What is needed is a system and method that is able to detect an activation input using a simplified circuit that requires less power to operate than conventional activation circuits.

Accordingly, the described system and method provides a technique for powering on an information handling device while in a low power state by use of a input detection system that requires less power to operate than traditional activation input components or systems. A input detection system present on an information handling device may detect a physical user input at an input mechanism of the information handling device while the information handling device is in a low power state. The input detection system may include a simplified activation circuit that can detect inputs that include activation inputs. For example, detecting the input may include detecting an amount of force supplied at the input mechanism by a user. Based upon the detected user input, the input detection system may determine the physical user input includes a request to power-on the information handling device. The input detection system may be able to differentiate between inputs at the device for powering on a device and those that are randomly provided without intent to power on a device. Thereafter, once an input request to power-on the information handling device is detected, the information handling device will power-on. Such a system provides a device that utilizes an activation circuit that requires less power than traditional activation input mechanisms.

The illustrated example embodiments will be best understood by reference to the figures. The following description is intended only by way of example, and simply illustrates certain example embodiments.

While various other circuits, circuitry or components may be utilized in information handling devices, with regard to smart phone and/or tablet circuitry 100, an example illustrated in FIG. 1 includes a system on a chip design found for example in tablet or other mobile computing platforms. Software and processor(s) are combined in a single chip 110. Processors comprise internal arithmetic units, registers, cache memory, busses, input/output (I/O) ports, etc., as is well known in the art. Internal busses and the like depend on different vendors, but essentially all the peripheral devices (120) may attach to a single chip 110. The circuitry 100 combines the processor, memory control, and I/O controller hub all into a single chip 110. Also, systems 100 of this type do not typically use serial advanced technology attachment (SATA) or peripheral component interconnect (PCI) or low pin count (LPC). Common interfaces, for example, include secure digital input/output (SDIO) and inter-integrated circuit (I2C).

There are power management chip(s) 130, e.g., a battery management unit, BMU, which manage power as supplied, for example, via a rechargeable battery 140, which may be recharged by a connection to a power source (not shown). In at least one design, a single chip, such as 110, is used to supply basic input/output system (BIOS) like functionality and dynamic random-access memory (DRAM) memory.

System 100 typically includes one or more of a wireless wide area network (WWAN) transceiver 150 and a wireless local area network (WLAN) transceiver 160 for connecting to various networks, such as telecommunications networks and wireless Internet devices, e.g., access points. Additionally, devices 120 are commonly included, e.g., a wireless communication device, external storage, etc. System 100 often includes a touch screen 170 for data input and display/rendering. System 100 also typically includes various memory devices, for example flash memory 180 and synchronous dynamic random-access memory (SDRAM) 190.

Figure 2:
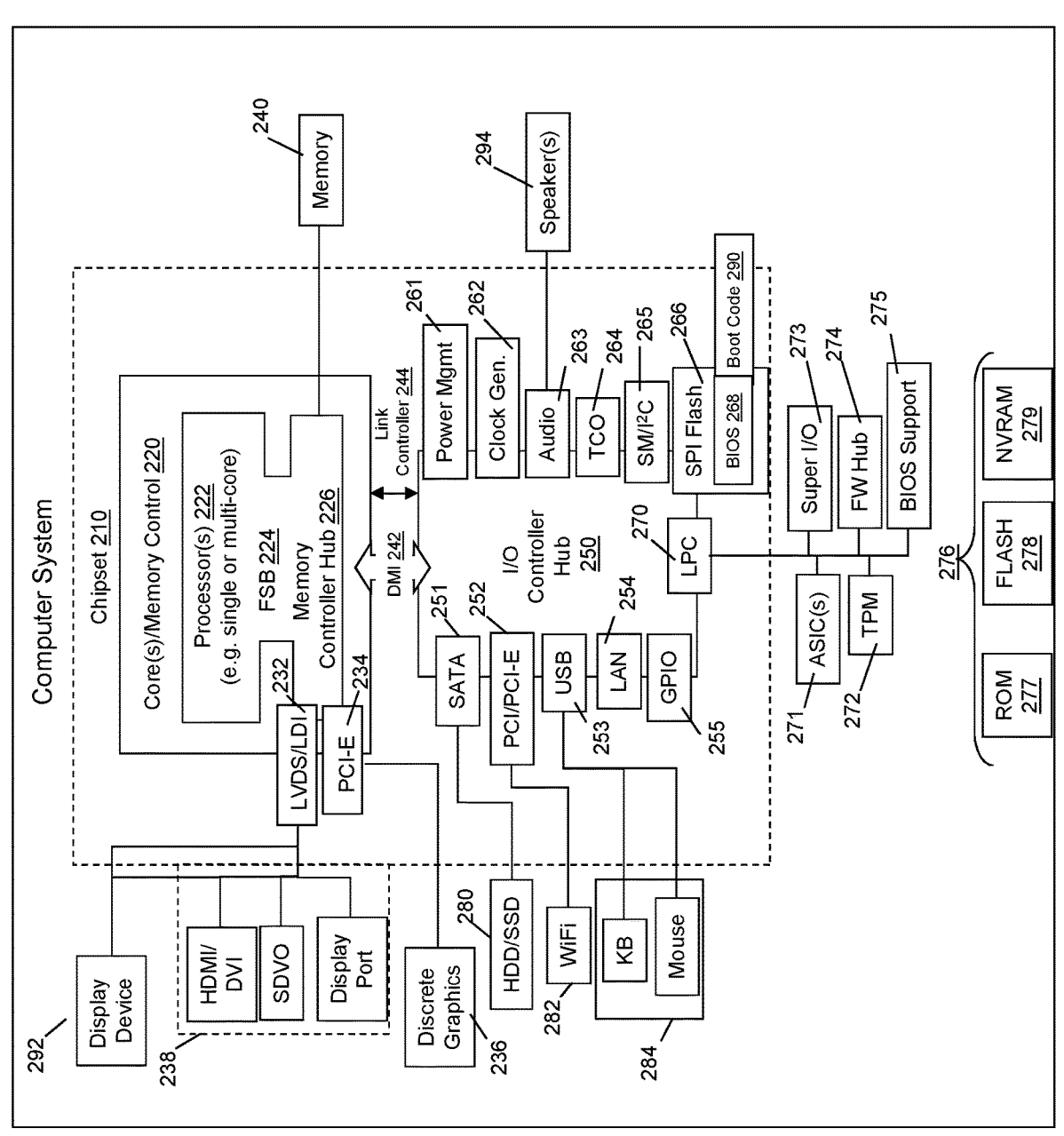
FIG. 2 illustrates another example of information handling device circuitry.

FIG. 2 depicts a block diagram of another example of information handling device circuits, circuitry or components. The example depicted in FIG. 2 may correspond to computing systems such as personal computers, or other devices. As is apparent from the description herein, embodiments may include other features or only some of the features of the example illustrated in FIG. 2.

The example of FIG. 2 includes a so-called chipset 210 (a group of integrated circuits, or chips, that work together, chipsets) with an architecture that may vary depending on manufacturer. The architecture of the chipset 210 includes a core and memory control group 220 and an I/O controller hub 250 that exchanges information (for example, data, signals, commands, etc.) via a direct management interface (DMI) 242 or a link controller 244. In FIG. 2, the DMI 242 is a chip-to-chip interface (sometimes referred to as being a link between a "northbridge" and a "southbridge"). The core and memory control group 220 include one or more processors 222 (for example, single or multi-core) and a memory controller hub 226 that exchange information via a front side bus (FSB) 224; noting that components of the group 220 may be integrated in a chip that supplants the conventional "northbridge" style architecture. One or more processors 222 comprise internal arithmetic units, registers, cache memory, busses, I/O ports, etc., as is well known in the art.

In FIG. 2, the memory controller hub 226 interfaces with memory 240 (for example, to provide support for a type of random-access memory (RAM) that may be referred to as "system memory" or "memory"). The memory controller hub 226 further includes a low voltage differential signaling (LVDS) interface 232 for a display device 292 (for example, a cathode-ray tube (CRT), a flat panel, touch screen, etc.). A block 238 includes some technologies that may be supported via the low-voltage differential signaling (LVDS) interface 232 (for example, serial digital video, high-definition multimedia interface/digital visual interface (HDMI/DVI), display port). The memory controller hub 226 also includes a PCI-express interface (PCI-E) 234 that may support discrete graphics 236.

In FIG. 2, the I/O hub controller 250 includes a SATA interface 251 (for example, for hard-disc drives (HDDs), solid-state drives (SSDs), etc., 280), a PCI-E interface 252 (for example, for wireless connections 282), a universal serial bus (USB) interface 253 (for example, for devices 284 such as a digitizer, keyboard, mice, cameras, phones, microphones, storage, other connected devices, etc.), a network interface 254 (for example, local area network (LAN)), a general purpose I/O (GPIO) interface 255, a LPC interface 270 (for application-specific integrated circuit (ASICs) 271, a trusted platform module (TPM) 272, a super I/O 273, a firmware hub 274, BIOS support 275 as well as various types of memory 276 such as read-only memory (ROM) 277, Flash 278, and non-volatile RAM (NVRAM) 279), a power management interface 261, a clock generator interface 262, an audio interface 263 (for example, for speakers 294), a time controlled operations (TCO) interface 264, a system management bus interface 265, and serial peripheral interface (SPI) Flash 266, which can include BIOS 268 and boot code 290. The I/O hub controller 250 may include gigabit Ethernet support.

The system, upon power on, may be configured to execute boot code 290 for the BIOS 268, as stored within the SPI Flash 266, and thereafter processes data under the control of one or more operating systems and application software (for example, stored in system memory 240). An operating system may be stored in any of a variety of locations and accessed, for example, according to instructions of the BIOS 268. As described herein, a device may include fewer or more features than shown in the system of FIG. 2.

Information handling device circuitry, as for example outlined in FIG. 1 or FIG. 2, may be used in devices such as tablets, smart phones, personal computer devices generally, and/or electronic devices, which may be used in a system that detects a physical user input at an input mechanism of an information handling device and thereafter determines that the physical user input is a request to power-on the information handling device. For example, the circuitry outlined in FIG. 1 may be implemented in a tablet or smart phone embodiment, whereas the circuitry outlined in FIG. 2 may be implemented in a personal computer embodiment.

Figure 3:
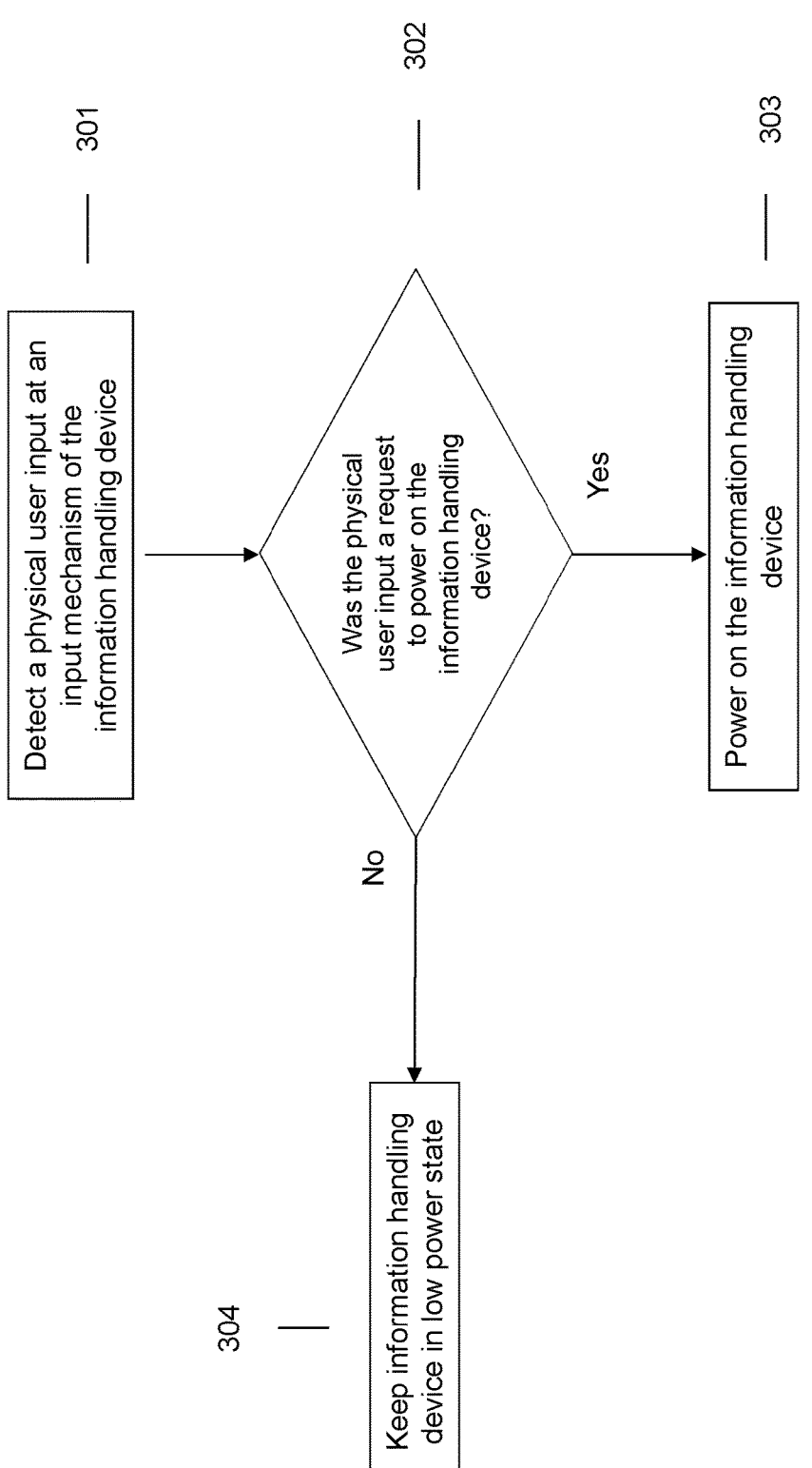
FIG. 3 illustrates an example method for powering on an information handling by use of a input detection system.

FIG. 3 illustrates an example method to power-on an information handling device based upon the detection of a physical user input and determine the request is a request to power-on the information handling device by use of a input detection system. The method may be implemented on a system which includes a processor, memory device, output devices (e.g., display device, etc.), input devices (e.g., keyboard, touch screen, mouse, microphones, sensors, biometric scanners, etc.), and/or other components, for example, those discussed in connection with FIG. 1 and/or FIG. 2. While the system may include known hardware and software components and/or hardware and software components developed in the future, the input detection system itself is specifically programmed to perform the functions as described herein to detect a physical user input at an input mechanism of an information handling device and thereafter determine that the physical user input is a request to power-on the information handling device.

The input detection system may run in the background of an information handling device and may be activated when the device or a low-power mode of the device is activated. The system may activate the system upon determining that the physical user input received at the input detection system is a request to power-on the information handling device. In this case, the input detection system may not be activated until at least one physical user input is received at the device. Once the input detection system is activated on a device, the system may be utilized throughout the process of detecting a physical user input at an input mechanism of the information handling device in a low-power state, determining the physical user input is a request to power-on the information handling device, and then powering-on the information handling device.

At 301, utilizing a input detection system present on an information handling device in a low power state, the system may detect a physical user input at an input mechanism of the information handling device. A low-power state of the information handling device is a state of the device where at least some components, applications, connections, and/or the like (collectively referred to as "components" for ease of readability), have been deactivated, thereby resulting in a reduction of power utilized by the system, even if the reduction of power is not the specific intention of the powering-down of these components. Typical components that are deactivated in a low-power include display devices; near-field, short-range, and other wireless communication devices; cameras; coupled components; certain applications; and/or the like.

In traditional systems, input mechanisms (e.g., keyboard, mouse, input buttons, etc.), are not deactivated in a low-power mode because these are utilized to detect inputs that correspond to requests to reactivate the device, where reactivating the device includes powering-on or activating those components that were deactivated in the low-power mode or state. However, in the described system, the input mechanisms do not need to remain fully powered. Rather, only a portion of the input mechanism may remain activated. Alternatively, the entire input mechanism may be deactivated and a simple circuit that can detect input at the input mechanism may remain active, thereby significantly reducing the amount of power utilized by the system in the low-power system as compared to traditional systems.

The input detection system may include one or more components that can detect input a physical user input at an input mechanism. As an example, the input detection system may include components that can detect a force provided at the input mechanism. The components may include deflection detection sensors, strain sensors or gauges, and/or the like. These components can detect a force when an input is provided at the input mechanism. Regardless of the components utilized to detect the physical user input, the physical user input provided at the input mechanism may be the same inputs that are typically provided when attempting to activate a device from a low-power mode. For example, the input may include the user pressing at least one key on the keyboard of the device, pressing a power button, moving the mouse, and/or the like. In other words, the input detection system does not need a specific or new type of user input to be provided to activate the system, although a new or specific type of user input is possible. For ease of readability, the description will refer to the physical user input being the user pressing at least one key on the keyboard of the information handling device; however, is the intended in being a non-limiting example of the physical user input.

Referring back to the example of utilizing components to detect a force at the input mechanism, when the user provides an input, the input detection system may detect a force of at the input mechanism. The force may be a deflection, a stress on a component, a movement of a component, and/or the like. Thus, even though the input provided may be a traditional input, the detection of the input is different. In traditional systems, the input mechanisms are kept activated and specific inputs are detected, meaning the system can identify the exact location or specific input component where the input was provided. In the described system, instead of detecting a specific input, the system instead detects that an input was generally provided, without attempting to distinguish where exactly the input was provided at the input mechanism. Rather, the input detection system includes components that can detect the force, or other input reading as described in more detail, caused by the provision of the physical user input.

Detecting the physical user input may include utilizing a physical input detection circuit. A physical input detection circuit uses simple electronic circuits which may operate without power or with minimal power. In the previous example, the circuit may include the force detection components. In another example, the circuit may include resistance detection components. In this example, when a physical user input is provided, the system may generate a measurable resistance. The resistance may be a directly generated resistance in response to the input or may be a converted resistance. For example, a circuit may detect a characteristic and then convert the characteristic to a resistance. As an example, the system may utilize a strain gauge to detect the force and then convert or translate the force to a resistance. It should be noted that the system may utilize a combination of input detection components or input detection components not specifically described. Additionally, physical user input detection components can be detected at different input mechanisms, for example, keys of a keyboard, input buttons, mouse, trackpad, and/or the like.

The system may determine if the user input detected at 301, is a request to power on the information handling device, at 302. To determine if the input is a request to power on the device, the input detection system may determine if the measured characteristic (e.g., force, resistance, deflection, strain, movement, etc.) meets or exceeds a predetermined threshold value corresponding to the characteristic. For example, the input detection system may determine if an amount of resistance detected when the physical user input was provided exceeds a predetermined threshold value. As another example, the input detection system may determine if an amount of force detected when the physical user input was provided exceeds a predetermined threshold value. To make this determination, the input detection system may compare the detected value for the characteristic to the predetermined threshold value. The predetermined threshold value may be a default value, may be set by the user, may be determined over time based upon user inputs using a machine-learning model, and/or the like.

By comparing the detected characteristic value to the predetermined value, the system may determine if the physical user input was a request for powering on the device, or an accidental input provided to the information handling device. For example, the input detection system may distinguish between a request to power-on the information handling device and a movement shock. When moving and/or carrying an information handling device, a user may accidently press a key on the information handling device, and/or when carrying an information handling device in a bag, (e.g., a backpack), shuffling in the bag may cause a key to be pushed on the information handling device. The movement of the device may also cause deflection or strain to be detected at the sensors. Thus, the system may attempt to distinguish between this device movement and a request to power on the device.

One technique to distinguish between accidental inputs and power-on requests in through the use of multiple force, resistance, and/or the like, sensors or gauges. Power-on request inputs will generally provide characteristic readings having a particular type of pattern, whereas movement or accidental input would provide characteristic readings having another type of pattern. Thus, these patterns could be distinguished to distinguish the type of input. Another technique that could be utilized is the use of additional components, for example, gyroscopes, accelerometers, proximity sensors, light sensors, and/or the like. These sensors could provide insight into the environment or context of the device to help distinguish input types. Another technique that could be utilized is the use of a machine-learning model that can learn inputs and characteristics of the inputs and desired responses (e.g., power-on versus accidental) using a training dataset having historical inputs and annotated input types (e.g., power-on, accidental, movement shock, etc.). The model can then be used to predict an input type corresponding to a received input. A combination of the described techniques or other techniques may be utilized to distinguish input types.

If the input detection system determines at 302 that the physical input was not a request to power on the information handling device, the system may keep the information handling device in the low-power mode or state at 304. This may occur if the system determines that the input was of an input type other than a power-on request. This may also occur if the characteristic value of the detected input does not meet or exceed the predetermined threshold value.

When the input detection system determines, at 302, the physical user input was a request to power on the information handling device, the system may power on the information handling device at 303. Powering on the device may include the system transmitting a signal to a power-on system of the device, thereby causing the device to power-on. For example, the circuit that detected the input may send a signal to the power-on system of the device. Powering on the device may include activating the components that were deactivated during the low-power mode or state. In other words, powering on the device may change the state of the device from a low-power state to a fully powered-on state.

As will be appreciated by one skilled in the art, various aspects may be embodied as a system, method or device program product. Accordingly, aspects may take the form of an entirely hardware embodiment or an embodiment including software that may all generally be referred to herein as a "circuit," "module" or "system." Furthermore, aspects may take the form of a device program product embodied in one or more device readable medium(s) having device readable program code embodied therewith.

It should be noted that the various functions described herein may be implemented using instructions stored on a device readable storage medium such as a non-signal storage device that are executed by a processor. A storage device may be, for example, an electronic, magnetic, optical, electromagnetic, infrared, or semiconductor system, apparatus, or device, or any suitable combination of the foregoing. More specific examples of a storage medium would include the following: a portable computer diskette, a hard disk, a random-access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a storage device is not a signal and is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire. Additionally, the term "non-transitory" includes all media except signal media.

Program code embodied on a storage medium may be transmitted using any appropriate medium, including but not limited to wireless, wireline, optical fiber cable, radio frequency, et cetera, or any suitable combination of the foregoing.

Program code for carrying out operations may be written in any combination of one or more programming languages. The program code may execute entirely on a single device, partly on a single device, as a stand-alone software package, partly on single device and partly on another device, or entirely on the other device. In some cases, the devices may be connected through any type of connection or network, including a local area network (LAN) or a wide area network (WAN), or the connection may be made through other devices (for example, through the Internet using an Internet Service Provider), through wireless connections, e.g., near-field communication, or through a hard wire connection, such as over a USB connection.

Example embodiments are described herein with reference to the figures, which illustrate example methods, devices and program products according to various example embodiments. It will be understood that the actions and functionality may be implemented at least in part by program instructions. These program instructions may be provided to a processor of a device, a special purpose information handling device, or other programmable data processing device to produce a machine, such that the instructions, which execute via a processor of the device implement the functions/acts specified.

It is worth noting that while specific blocks are used in the figures, and a particular ordering of blocks has been illustrated, these are non-limiting examples. In certain contexts, two or more blocks may be combined, a block may be split into two or more blocks, or certain blocks may be re-ordered or re-organized as appropriate, as the explicit illustrated examples are used only for descriptive purposes and are not to be construed as limiting.

As used herein, the singular "a" and "an" may be construed as including the plural "one or more" unless clearly indicated otherwise.

This disclosure has been presented for purposes of illustration and description but is not intended to be exhaustive or limiting. Many modifications and variations will be apparent to those of ordinary skill in the art. The example embodiments were chosen and described in order to explain principles and practical application, and to enable others of ordinary skill in the art to understand the disclosure for various embodiments with various modifications as are suited to the particular use contemplated.

Thus, although illustrative example embodiments have been described herein with reference to the accompanying figures, it is to be understood that this description is not limiting and that various other changes and modifications may be affected therein by one skilled in the art without departing from the scope or spirit of the disclosure.

What is claimed is:

1. A method, comprising:

detecting, at an information handling device utilizing an input detection system employing a physical input detection circuit and while the information handling device is in a low power state, a physical user input at an input mechanism of the information handling device, wherein the detecting comprises detecting a characteristic of the input at the input mechanism utilizing the physical input detection circuit that detects the characteristics of the input and detecting a force comprising an amount of deflection at the input mechanism, wherein at least a portion of the input mechanism remains deactivated while the information handling device is in the low power state;

determining, utilizing the input detection system employing a machine-learning model and subsequent to detecting the characteristic of the input, the physical user input comprises a request to power-on the information handling device, wherein the determining comprises determining that the amount of the force exceeds a predetermined threshold and distinguishes the physical user input as a request to power-on the information handling device as opposed to a movement shock, wherein the machine-learning model associates the characteristic of the input with a desired response; and the predetermined threshold is computed over time based upon user inputs using the machine-learning model; and in response to the determining, powering on the information handling device, wherein the powering on comprises receiving a signal from the physical input detection circuit at a power-on circuit of the information handling device.

2. The method of claim 1, wherein the physical user input comprises pressing at least one key.

3. The method of claim 1, wherein the input mechanism is deactivated during the low power state.

4. The method of claim 1, wherein the detecting a force comprises measuring, using at least one sensor, an amount of resistance resulting from the physical user input.

5. The method of claim 4, wherein the at least one sensor comprises a strain gauge.

6. The method of claim 4, wherein the determining comprises determining that the amount of resistance exceeds a predetermined threshold.

7. The method of claim 1, comprising determining, utilizing a keyboard deflection system, the physical user input does not comprise a request to power-on the information handling device and keeping the information handling device in the low power state.

8. The method of claim 1, wherein the machine-learning model identifies at least one characteristic of an input received at an information handling device in a low power state and predicts an input type corresponding to the input received;

wherein the predicting an input type comprises the machine-learning model associating the at least one characteristic with a desired response based upon a plurality of historical inputs and annotated input types previously received by the input detection system of the information handling device.

9. The system of claim 1, wherein the machine-learning model identifies at least one characteristic of an input received at an information handling device in a low power state and predicts an input type corresponding to the input received;

wherein to predict an input type comprises the machine-learning model associating the at least one characteristic with a desired response based upon a plurality of historical inputs and annotated input types previously received by the input detection system of the information handling device.

10. A system, comprising:

an input mechanism;

a processor operatively coupled to the input mechanism;

a memory device that stores instructions that when executed by the processor, causes the system to:

detect, an input detection system, employing a physical input detection circuit and while the information handling device is in a low power state, a physical user input at the input mechanism of the information handling device, wherein to detect comprises detecting a characteristic of the input at the input mechanism utilizing the physical input detection circuit that detects the characteristics of the input and detecting a force comprising an amount of deflection at the input mechanism, wherein at least a portion of the input mechanism remains deactivated while the information handling device is in the low power state;

determine, utilizing the input detection system employing a machine-learning model and subsequent to detecting the characteristic of the input, the physical user input comprises a request to power-on the information handling device, wherein to determine comprises determining that the amount of the force exceeds a predetermined threshold and distinguishes the physical user input as a request to power-on the information handling device as opposed to a movement shock, wherein the machine-learning model associates the characteristic of the input with a desired response; and the predetermined threshold is computed over time based upon user inputs using the machine-learning model; and in response to the determining, power on the information handling device, wherein to power on comprises receiving a signal from the physical input detection circuit at a power-on circuit of the information handling device.

11. The system of claim 10, wherein the physical user input comprises pressing at least one key.

12. The system of claim 10, wherein the input mechanism is deactivated during the low power state.

13. The system of claim 10, wherein the detecting a force comprises measuring, using at least one sensor, an amount of resistance resulting from the physical user input.

14. The system of claim 13, wherein the at least one sensor comprises a strain gauge.

15. The system of claim 13, wherein the determining comprises determining that the amount of resistance exceeds a predetermined threshold.

16. A product, the product comprising:

a non-transitory computer-readable storage device that stores executable code that, when executed by the processor, causes the product to:

detect, an input detection system employing a physical input detection circuit and while the information handling device is in a low power state, a physical user input at an input mechanism of the information handling device, wherein to detect comprises detecting a characteristic of the input at the input mechanism utilizing the physical input detection circuit that detects the characteristics of the input and detecting a force comprising an amount of deflection at the input mechanism, wherein at least a portion of the input mechanism remains deactivated while the information handling device is in the low power state;

determine, utilizing the input detection system employing a machine-learning model and subsequent to detecting the characteristic of the input, the physical user input comprises a request to power-on the information handling device, wherein determine comprises determining that the amount of the force exceeds a predetermined threshold and distinguishes the physical user input as a request to power-on the information handling device as opposed to a movement shock, wherein the machine-learning model associates the characteristic of the input with a desired response; and the predetermined threshold is computed over time based upon user inputs using the machine-learning model; and in response to the determining, power on the information handling device, wherein to power on comprises receiving a signal from the physical input detection circuit at a power-on circuit of the information handling device.

* * * * *